US005343694A

United States Patent [19]

Toborg et al.

[11] Patent Number: 5,343,694

[45] Date of Patent: Sep. 6, 1994

[54] TURBINE NOZZLE SUPPORT

[75] Inventors: Steven M. Toborg, Lynn; Roger W. Schonewald, Ipswich, both of Mass.

[73] Assignee: General Electric Company, Cincinnati, Ohio

[21] Appl. No.: 59,863

[22] Filed: May 10, 1993

Related U.S. Application Data

[63] Continuation of Ser. No. 734,008, Jul. 22, 1991, abandoned.

[51] Int. Cl.[5] .................... F02C 7/20

[52] U.S. Cl. .................... 60/39.31; 415/209.2; 415/209.3

[58] Field of Search .................... 60/39.31, 39.32, 39.75; 415/189, 190, 191, 208.3, 209.2, 209.3

[56] References Cited

U.S. PATENT DOCUMENTS

| | | | |
|---|---|---|---|
| 2,620,158 | 12/1952 | Frankel | 253/77 |
| 2,654,566 | 10/1953 | Boyd et al. | 253/78 |
| 2,799,473 | 7/1957 | Smith et al. | 253/78 |
| 2,937,000 | 5/1960 | Ledwith | 253/78 |
| 3,302,926 | 2/1967 | Bobo | 253/78 |
| 3,363,416 | 1/1968 | Heybyrne et al. | 60/39.75 |
| 3,365,173 | 1/1968 | Lynch et al. | 415/209.3 |
| 3,909,155 | 9/1975 | Whinfrey | 415/209.3 |
| 4,011,718 | 3/1977 | Asplund | 60/39.31 |
| 4,194,869 | 3/1980 | Corcokios | 415/189 |
| 4,309,145 | 1/1982 | Viola | 415/208.2 |
| 4,391,565 | 7/1983 | Speak | 415/189 |
| 4,492,517 | 1/1985 | Klompas | 415/139 |
| 4,524,980 | 6/1985 | Lillibridge et al. | 415/191 |
| 4,639,189 | 1/1987 | Rosman | 415/115 |
| 4,749,333 | 6/1988 | Bonner et al. | 415/189 |
| 4,798,514 | 1/1989 | Pask | 415/115 |
| 4,815,933 | 3/1989 | Hansel et al. | 415/189 |
| 4,856,963 | 8/1989 | Klapproth et al. | 415/190 |
| 4,883,405 | 11/1989 | Walker | 415/137 |

FOREIGN PATENT DOCUMENTS

| | | | |
|---|---|---|---|
| 0593186 | 2/1960 | Canada | 60/39.31 |
| 0017534 | 10/1980 | European Pat. Off. | 415/189 |
| 0161203 | 11/1985 | European Pat. Off. . | |
| 2432365A1 | 5/1974 | Fed. Rep. of Germany . | |

*Primary Examiner*—Richard A. Bertsch
*Assistant Examiner*—Michael I. Kocharov
*Attorney, Agent, or Firm*—Nathan D. Herkamp; Jerome C. Squillaro

[57] ABSTRACT

A gas turbine nozzle includes a plurality of nozzle segments having a pair of nozzle vanes supported by inner and outer shroud segments. Each inner shroud segment includes a circumferential retention slot and a radial retention slot in generally circumferential alignment and an interlocking tab and slot arrangement at the respective ends to provide engagement between adjacent flange segments. A 360 degree retention ring includes a plurality of circumferential retention tabs and radial retention tabs to engage respective ones of the plurality of flange segments to secure the nozzle segments in a circumferential ring about the outlet of a gas turbine combustor.

6 Claims, 5 Drawing Sheets

Fig. 4
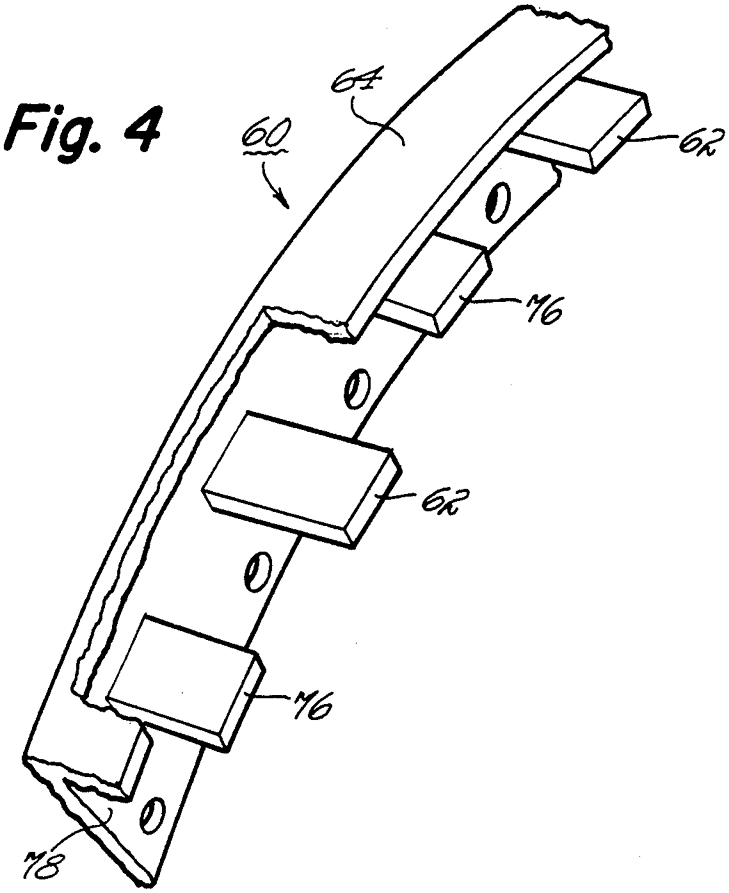
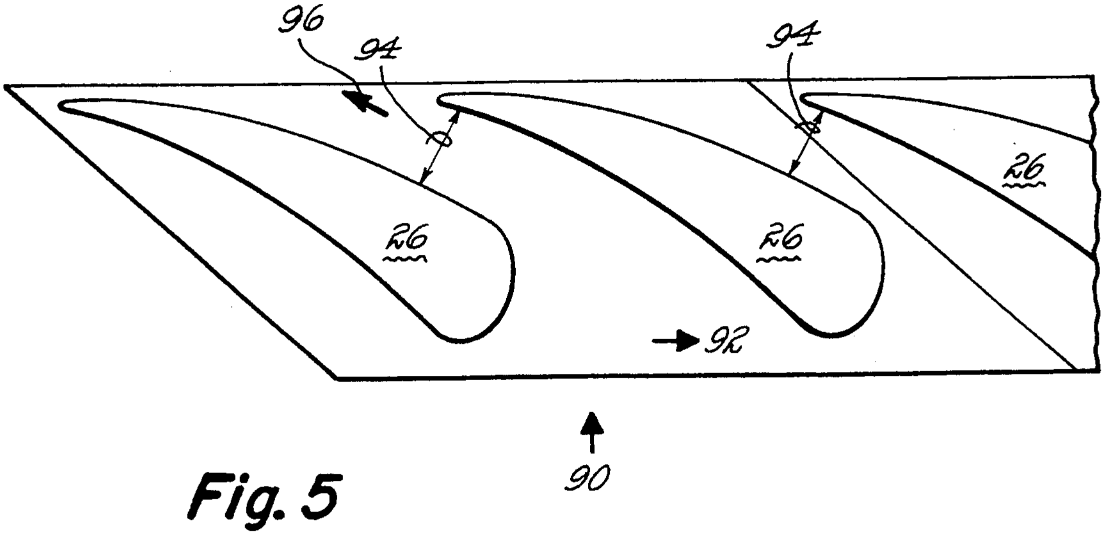
Fig. 5

Fig. 6
PRIOR ART
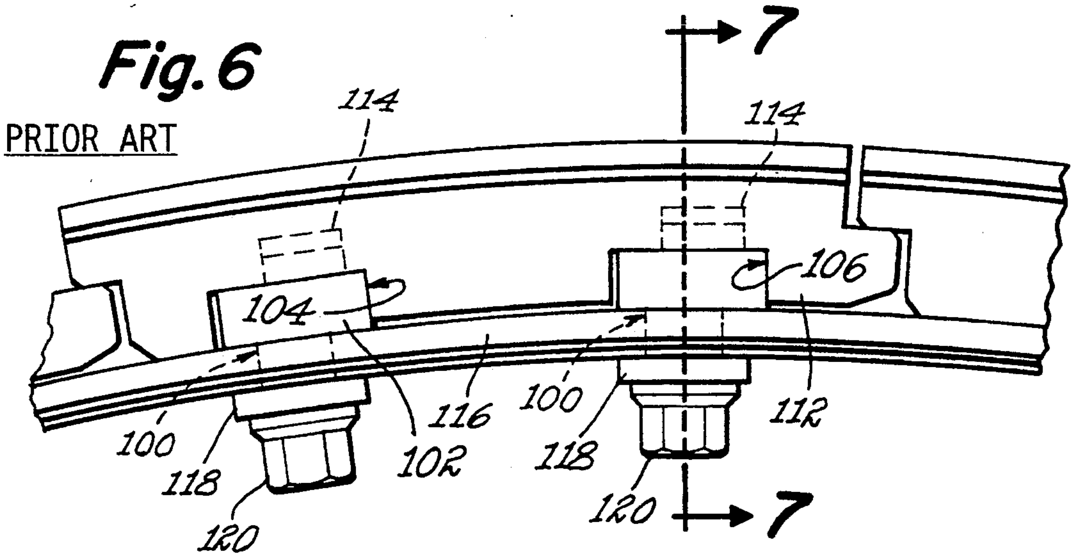
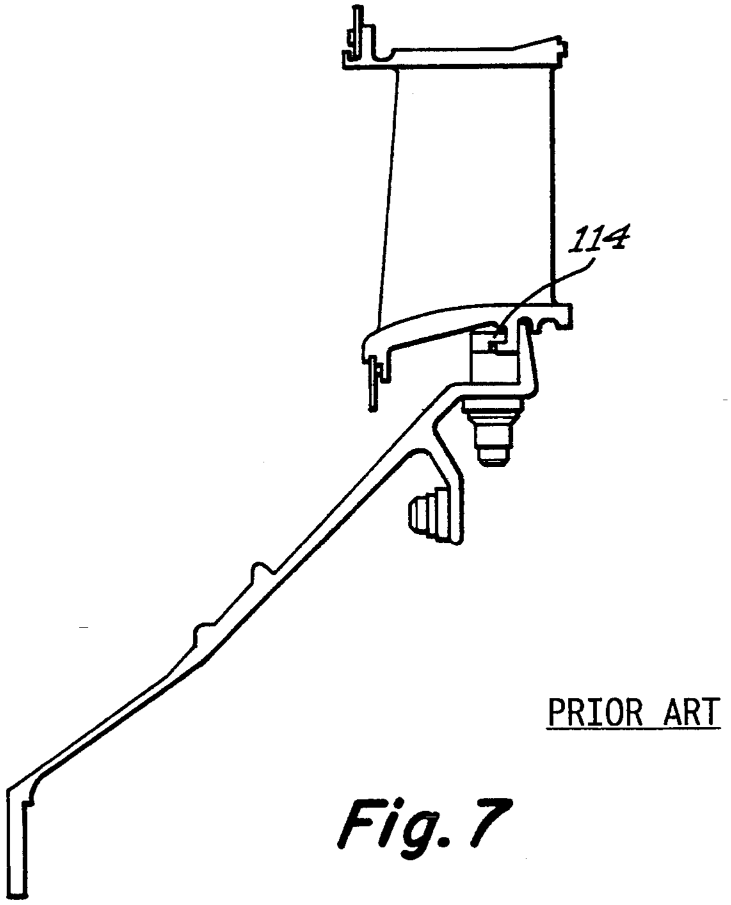
PRIOR ART
Fig. 7

TURBINE NOZZLE SUPPORT

This application is a continuation of application Ser. No. 07/734,008, filed Jul. 22, 1991, now abandoned.

BACKGROUND OF THE INVENTION

This invention relates to gas turbine engines and specifically to mounting arrangements for high pressure turbine nozzles.

The high pressure turbine nozzle of a gas turbine engine performs an aerodynamic function in that it accelerates and directs the hot gas flow from the combustor into the high pressure turbine rotor. As such, the turbine nozzle experiences large pressure loads across it due to the reduction in static pressure between inlet and exit planes. It is also exposed to high thermal gradients resulting from exposure to the hot gases of the engine flow path and the cooling air flowing through turbine structures. It is therefore necessary to provide attachment structure to support nozzle vanes in the gas flow path in a manner to minimize the effects of thermal gradients while accommodating the pressure loads experienced by the vanes.

One prior art nozzle retaining technique employs a plurality of hook bolts attached around the circumference of a nozzle support structure attached to the combustor. The hook bolts provide both radial retention and circumferential load stop for nozzle segments attached by the respective hook bolts to the nozzle support. Such a configuration requires a plurality of hook bolts attached to respective segments of the nozzle, which limits the precision of nozzle segment mounting to the total of accumulated tolerance limits for the bolts, flanges, and retainers.

SUMMARY OF THE INVENTION

An object of the present invention is to provide a novel turbine nozzle mounting arrangement.

A gas turbine nozzle mounting arrangement as described herein includes a plurality of nozzle segments having pairs of nozzle vanes mounted to respective inner and outer arcuate shroud segments. A nozzle mounting flange projects radially inward from the inner shroud segment to provide attachment of the nozzle segment to a circumferential nozzle retainer. The nozzle retainer includes a plurality of circumferential retention tabs which alternate with a plurality of radial retention tabs to secure respective nozzle segments to the combustor support flange.

BRIEF DESCRIPTION OF THE DRAWINGS

The features of the invention believed to be novel and unobvious over the prior art are set forth with particularity in the appended claims. The invention itself, however, as to organization, method of operation and advantages thereof, may best be understood by a reference to the following description taken in conjunction with the accompanying drawings, in which like reference characters refer to like elements throughout, and in which:

FIG. 4 is a schematic, partial cross-sectional, perspective view of the nozzle retainer of the present invention;

FIG. 5 is a schematic, partial cross-sectional end view of a nozzle retainer according to the present invention taken along lines 5—5 of FIG. 1;

FIG. 6 is a schematic, partial cross-sectional view showing a prior art mounting arrangement; and FIG. 7 is a schematic, partial cross-sectional view taken along line 7—7 of FIG. 6.

DETAILED DESCRIPTION OF THE INVENTION

It is critically important to the performance of gas turbine engines that the nozzle outlet between each pair of adjacent vanes be as nearly identical as practicable in order to provide for uniformity of the hot gas stream around the nozzle to provide a uniform driving force on the high pressure rotor blades. The vanes are manufactured and assembled into pairs with inner and outer shroud segments to provide the desired outlet structure for the nozzle. The present invention provides a mounting arrangement to maintain the desired outlet between vanes of adjacent nozzle segments over the operating range of the gas turbine engine.

Figure 1:
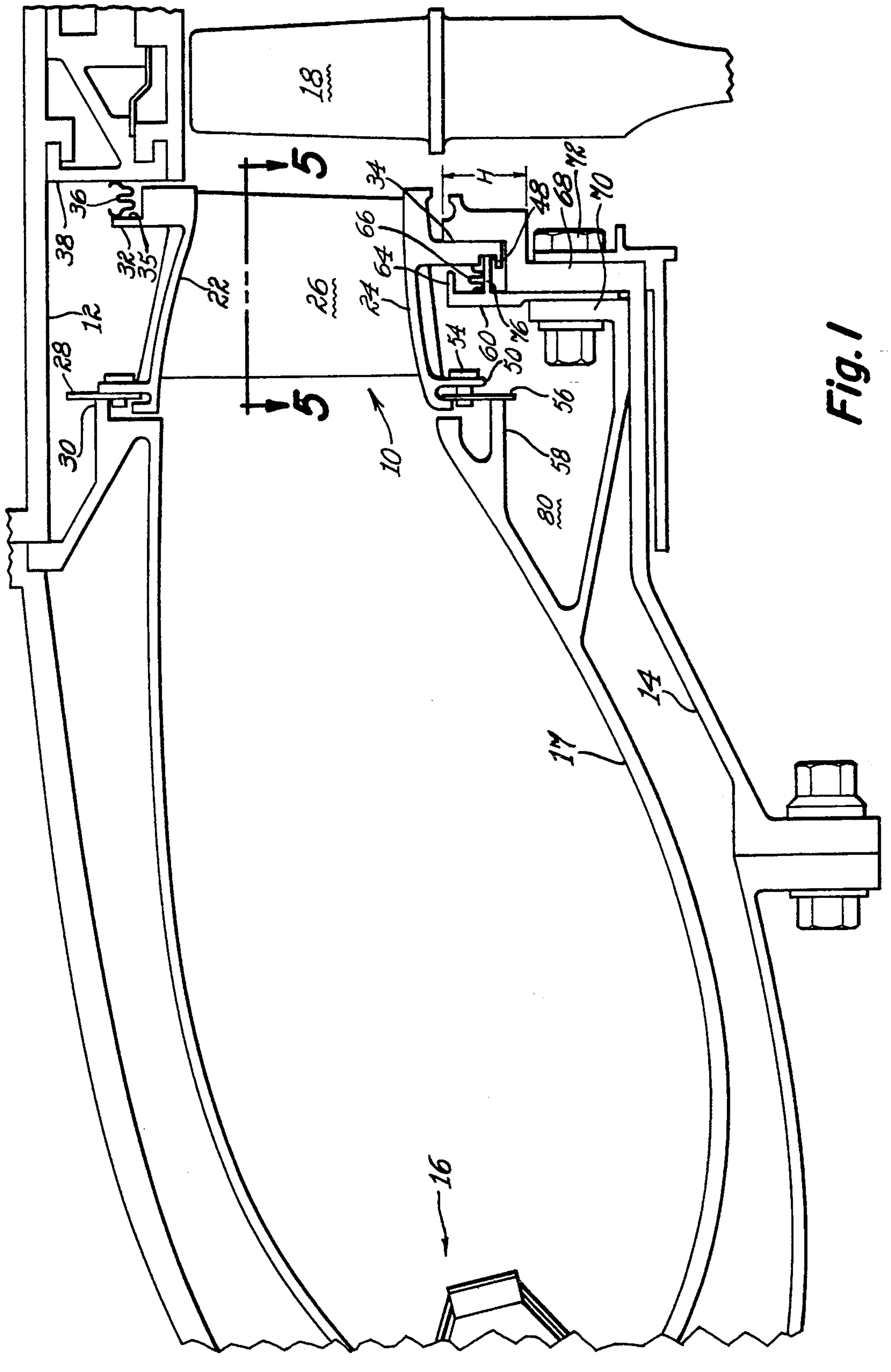
FIG. 1 is a schematic, partial cross-sectional view of the gas turbine combustor, nozzle and rotor arrangement of the present invention.

FIG. 1 illustrates a portion of a gas turbine engine including a turbine nozzle 10 disposed between an outer casing 12 and inner wall 14. A gas turbine combustor 16 is located upstream of the nozzle segments and a turbine rotor is disposed downstream from the nozzle segments. An annular combustor liner 17 surrounds the combustor to direct hot gas from the combustor to the turbine blades 18 via the nozzle 10 at a desired velocity and angle to drive the turbine rotor in rotation about its axis, which coincides substantially with the engine centerline to provide power to the gas turbine compressor (not shown) and accessories of the gas turbine engine.

Figure 2:
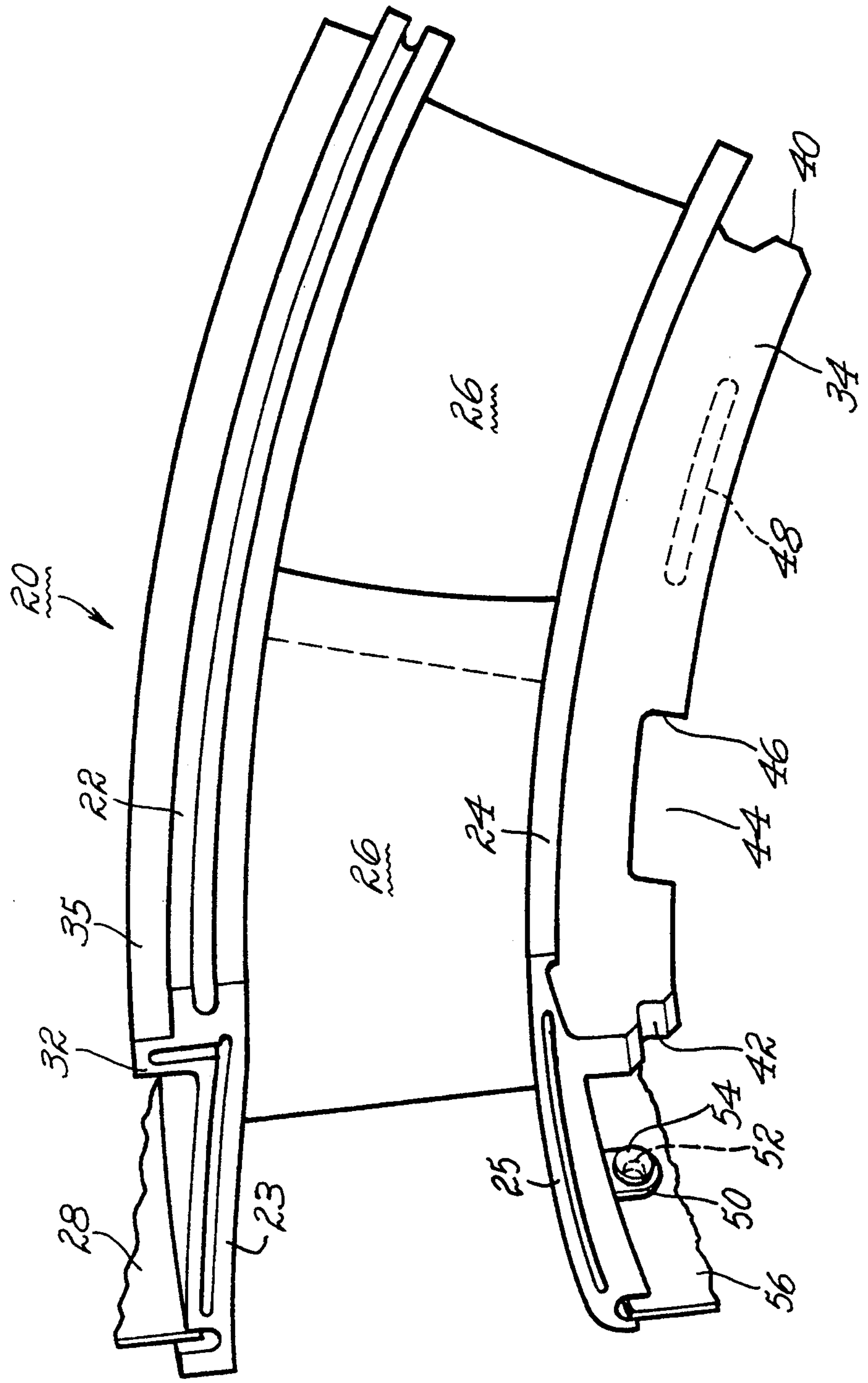
FIG. 2 is a schematic plan view of a nozzle segment according to the present invention.

The nozzle 10 comprises a plurality of nozzle segments 20, as shown in FIG. 2, having an arcuate outer shroud segment 22, an arcuate inner shroud segment 24, and a pair of nozzle vanes 26 mounted between the shroud segments. The nozzle vanes 26 are of generally airfoil shape and extend generally radially between the inner and outer shroud segments. The outer shroud segment 22 includes a generally axially extending platform 23 with a circumferentially extending seal member 28 attached to the upstream end thereof to seal with the combustor liner flange 30 against leakage therebetween. A radially extending circumferential projection 32 is attached to the downstream end of the platform 23 for providing an engagement surface 35 for a W seal 36 to prevent leakage between the outer rotor casing 38 and the shroud segment 22. The inner shroud segment 24 includes a generally axially extending platform 25 with an arcuate flange segment 34 having an interlocking tab 40 at one circumferential end thereof and a complementarily shaped notch 42 at the opposite circumferential end thereof. The flange segment 34 also includes a circumferential retention slot 44 having a surface 46 for reacting the tangential load applied to the segment by hot gas passing through the turbine nozzle, and a radial retention slot 48 located generally in circumferential alignment with slot 44 and extending partially through the flange segment to provide for radial retention of the nozzle segment 20. The inner shroud segment 24 also includes a plurality of tabs 50 having respective holes 52 therethrough for rivets 54 mounting a seal member 56 to engage a combustor liner flange 58 to prevent passage of hot gases from the combustor onto the radially inner surfaces of the inner shroud segment 24.

FIG. 1 illustrates the nozzle retainer 60 having a radial retention tab 76 disposed within the radial retention slot 48 in the shroud flange segment 34. The retainer 60 also includes a capture flange 64 to accommodate a W seal 66 disposed between the nozzle retainer 60 and the flange segment 34. The nozzle retainer 60 is secured to the nozzle support flange 68 and liner flange 70 via a plurality of generally axially extending bolts 72.

Figure 3:
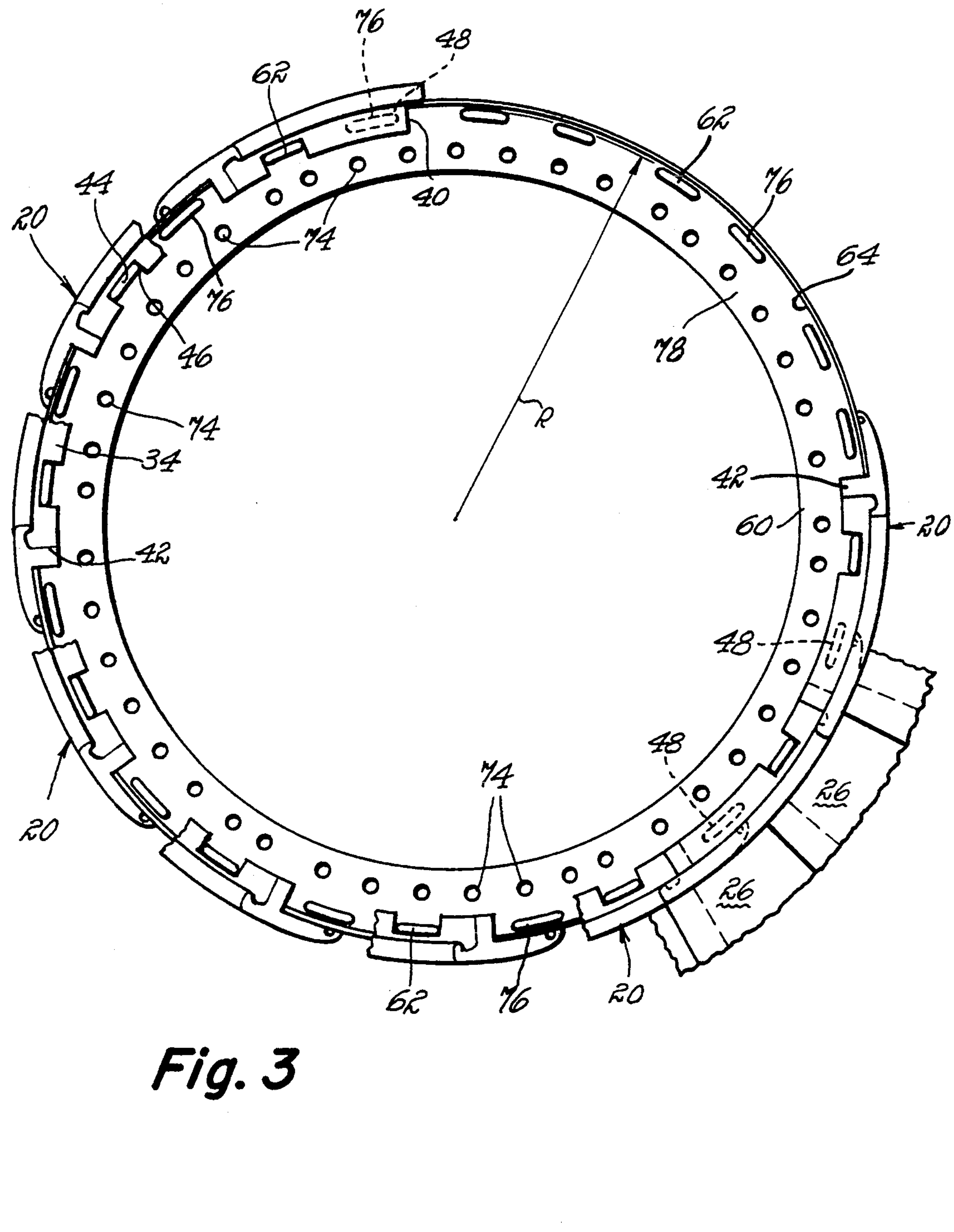
FIG. 3 is a schematic plan view of a nozzle retainer according to the present invention.

The nozzle retainer 60 is illustrated in a schematic plan view in FIG. 3. The retainer is a full circumferential ring having a plurality of mounting bolt holes 74 for securing the retainer to the circumferential nozzle support flange 68 attached to the combustor. The retainer 60 includes a plurality of radial retention tabs 76 and a plurality of circumferential retention tabs 62. The circumferential retention tabs 62 and radial retention tabs 76 alternate around the circumference of the retainer 60. As shown in FIG. 4, the tabs 62 and 76 project axially from one axial face 78 of the retainer 60. The respective nozzle segments 20 are mounted side-by-side circumferentially around the nozzle retainer to form a generally annular turbine nozzle 10. As shown in FIG. 3, one side of each circumferential retention tab 62 forms a circumferential retention surface which engages the circumferential retention surface 46 on the flange segment 34 of each respective nozzle segment. Each radial retention tab 76 engages the radial retention slot 48 within the flange segment 34 in approximately circumferential alignment with the circumferential retention tab 62 at radius R from the turbine centerline. By using the circumferential retainer 60, the positioning of adjacent nozzle segments 20 is subject only to tolerance variations in the manufacture of shroud flange elements and retainer slots of each individual nozzle segment.

In operation a hot gas stream from the combustor impinges upon the vanes 26 of the nozzle 10 in the direction shown at arrow 90 in FIG. 5 and cause the vane to tend to travel axially rearward in the direction of arrow 90. This tendency assists in sealing W seal 36. The turning of the hot gas stream generates a reaction tending to move the segments 20 circumferentially as shown by arrow 92. The nozzle turns the hot gas stream to the direction of arrow 96 to provide the force to drive the turbine. The circumferential retention tabs 62 react that force at surface 46 to preclude tangential movement of the nozzle segments. The force of the gas stream also tends to tilt the nozzle segments, but this force is reacted by the interconnection of adjacent segments via the interlocking tabs 40 and slots 42 located at the respective ends of the flange segments 24. When the engine is not in use and consequently the nozzle segments are not under the gas path pressure required to retain the nozzle segments in circumferential alignment at the proper radius R, the radial retention tabs 76 provide positioning of the nozzle segments around the retainer ring.

Cooling air is provided to the chamber 80 of the respective inner shroud segments 24 to limit thermal expansion of the shroud elements and to provide cooling flow to the respective vanes 26 via cooling passages internal to the vanes to limit heating caused by the hot gases impinging upon them from the combustor. The pressure of cooling air on the seals 28 and 56 is maintained higher than the pressure of the hot stream gases to close the seals and prevents hot stream gases from entering the vane support areas. As the mounting flange 34 is heated, thermal stresses are created in the nozzle support flange 68. By reducing the radial dimension, H, of the nozzle support flange 68 the thermal stresses imposed by heating are reduced. Further, the smaller radial dimension of the flange enables the mounting of the vanes within a smaller total radial dimension of a small gas turbine engine.

In FIGS. 6 and 7 a prior art nozzle mounting arrangement is schematically illustrated. A pair of hook bolts 100 are used to attach the nozzle flange 112 to the combustor casing. Each of the hook bolts includes a head 102 having a stop surface 104 engaging slot surface 106 to react the tangential load and a hook 114 to provide a static radial stop. The bolt 100 extends through the nozzle support flange 116 and is secured by a washer 118 and nut 120. As will be apparent, the retention hook 114 requires the nozzle support flange 116 to have a substantially greater radial height than that of the present invention illustrated in FIG. 3. In arrangements such as that in FIG. 6 which are individually bolted, tolerance variations can accumulate so that the precision of placement of individual nozzle vanes is limited by the accumulated tolerances.

It will be appreciated by the those skilled in the art that variations on the details of construction illustrated and described herein are within the scope of the invention.

What is claimed as new and is desired to be secured by Letters Patent of the United States is:

1. A gas turbine nozzle arrangement comprising:
- a plurality of nozzle segments each comprising:
  - an outer arcuate shroud segment;
  - an inner arcuate shroud segment comprising: a generally arcuate, axially extending platform; a circumferential nozzle mounting flange projecting radially inward from said platform; and a circumferential retention slot passing through said flange and a radial retention slot in generally circumferential alignment with said circumferential retention slot and extending partially through said flange; and
  - a plurality of vanes extending between and connected to said outer and inner shroud segments;
- annular nozzle retaining means for securing said plurality of nozzle segments in a generally annular configuration;
- a nozzle support flange attached to a gas turbine combustor around the axis of the gas turbine; and
- a plurality of fasteners for securing said nozzle retaining ring to said nozzle support flange.

2. The invention of claim 1 wherein said nozzle retaining means comprises:
- a generally circular nozzle retainer ring having a plurality of circumferential retention tabs extending in a generally axial direction from said ring and a plurality of radial retention tabs extending in a generally axial direction from said ring such that alternate ones of said tabs are radial retention tabs separated by respective ones of said circumferential retention tabs.

3. In a gas turbine engine including in serial flow relationship:
- an annular combustor generally concentric about an engine centerline, a nozzle arrangement and a turbine rotatable about an axis of rotation generally coincident with said engine centerline; said nozzle arrangement comprising:

a plurality of nozzle segments arranged in a generally annular configuration about said centerline and each comprising:

an outer arcuate shroud segment;

an inner arcuate shroud segment;

a plurality of generally radially extending vanes disposed between said outer shroud segment and said inner shroud segment and each connected to said outer shroud segment and said inner shroud segment; said vanes having spaced leading and trailing edges and defining therebetween flow passages for hot gases from a gas turbine combustor; and each said inner shroud segment including a platform and a circumferential nozzle mounting flange projecting radially inward therefrom; each said flange having a circumferential retention slot and a radial retention slot disposed therein in generally circumferential alignment;

a circumferential nozzle retainer having a plurality of circumferential retention tabs and a plurality of radial retention tabs disposed thereon in generally circumferential alignment for securing said plurality of nozzle segments in a generally annular configuration about the centerline;

a nozzle support flange attached to a gas turbine combustor around the engine centerline; and a plurality of fasteners securing said nozzle retainer to said nozzle support flange to hold said mounting flange therebetween.

4. The invention of claim 3 wherein:

each of said plurality of circumferential retention tabs includes a circumferential retention surface; and each of said mounting flanges has a circumferential retention surface on its respective circumferential retention slot for engagement with a retention surface of a respective one of said circumferential retention tabs.

5. The invention of claim 3 wherein:

each of said respective radial retention slots extends partially through its respective flange segment; and each of said radial retention tabs extends axially from said retainer ring, a distance sufficient to engage a respective one of said radial retention slots.

6. The invention of claim 3 wherein:

each of said respective flange segments further comprises an interlocking tab projecting from a first end of said flange segment and a complimentary interlocking slot disposed in the opposite end of said flange segment for engagement with an interlocking tab of a circumferentially adjacent flange segment.

* * * * *